United States Patent
De-Gregorio-Rodriguez et al.

(10) Patent No.: US 12,526,735 B2
(45) Date of Patent: *Jan. 13, 2026

(54) EFFICIENT HANDLING OF SUBSCRIPTIONS

(71) Applicant: Telefonaktiebolaget LM Ericsson (publ), Stockholm (SE)

(72) Inventors: Jesus-Angel De-Gregorio-Rodriguez, Madrid (ES); Xiaowei Zhang, Shanghai (CN); Yubao Ma, Shanghai (CN); Xinyu Zhang, Shanghai (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 18/670,569

(22) Filed: May 21, 2024

(65) Prior Publication Data

US 2024/0389012 A1    Nov. 21, 2024

Related U.S. Application Data

(63) Continuation of application No. 17/293,876, filed as application No. PCT/IB2019/058840 on Oct. 17, 2019, now Pat. No. 12,028,799.

(30) Foreign Application Priority Data

Nov. 16, 2018   (WO) ............... PCT/CN2018/115834

(51) Int. Cl.
 *H04W 48/00*   (2009.01)
 *H04W 4/50*    (2018.01)
 (Continued)

(52) U.S. Cl.
 CPC ............. *H04W 48/18* (2013.01); *H04W 4/50* (2018.02); *H04W 8/18* (2013.01); *H04W 60/02* (2013.01); *H04W 60/06* (2013.01)

(58) Field of Classification Search
 CPC ......... H04W 48/18; H04W 4/50; H04W 8/18; H04W 60/02; H04W 60/06
 See application file for complete search history.

(56) References Cited

U.S. PATENT DOCUMENTS

| 12,028,799 B2* | 7/2024 | De-Gregorio-Rodriguez ............. H04L 67/02 |
| 2002/0112058 A1* | 8/2002 | Weisman ............... G06F 9/4411 709/227 |

(Continued)

FOREIGN PATENT DOCUMENTS

| CN | 110557744 A | * 12/2019 | .......... H04L 61/1511 |
| WO | 2018008944 A1 | 1/2018 | |

(Continued)

OTHER PUBLICATIONS

International Search Report and Written Opinion issued in International Application No. PCT/IB2019/058840 dated Feb. 5, 2020 (12 pages).

(Continued)

*Primary Examiner* — Khai M Nguyen
(74) *Attorney, Agent, or Firm* — Rothwell, Figg, Ernst & Manbeck, P.C.

(57) ABSTRACT

Methods and nodes related to subscription handling and notifications, for instance, with respect to Network Function (NF) management services, are described.

19 Claims, 7 Drawing Sheets

(51) Int. Cl.
*H04W 8/18* (2009.01)
*H04W 48/18* (2009.01)
*H04W 60/02* (2009.01)
*H04W 60/06* (2009.01)

(56) References Cited

U.S. PATENT DOCUMENTS

| | | | |
|---|---|---|---|
| 2011/0213758 A1* | 9/2011 | Cao | H04L 67/306 |
| | | | 707/769 |
| 2018/0270001 A1* | 9/2018 | Deshpande | H04W 4/90 |
| 2018/0376444 A1 | 12/2018 | Kim | |
| 2019/0251241 A1 | 8/2019 | Bykampadi et al. | |
| 2020/0153707 A1* | 5/2020 | Lu | H04L 67/51 |
| 2023/0199453 A1* | 6/2023 | Xu | H04L 67/34 |
| | | | 455/418 |

FOREIGN PATENT DOCUMENTS

| | | |
|---|---|---|
| WO | 2018066876 A1 | 4/2018 |
| WO | 2020083516 A1 | 4/2020 |

OTHER PUBLICATIONS

3GPP TS 23.501 V15.3.0 (Sep. 2018), 3rd Generation Partnership Project, Technical Specification Group Services and System Aspects; System Architecture for the 5G System; Stage 2 (Release 15), Sep. 2018 (226 pages).

3GPP TS 23.502 V15.3.0 (Sep. 2018), 3rd Generation Partnership Project; Technical Specification Group Services and System Aspects; Procedures for the 5G System; Stage 2 (Release 15), Sep. 2018 (330 pages).

3GPP TS 29.510 V15. 1.0 (Sep. 2018), 3rd Generation Partnership Project; Technical Specification Group Core Network and Terminals; 5G System; Network Function Repository Services; Stage 3 (Release 15), Sep. 2018 (84 pages).

Patch verb—Wikipedia, Oct. 12, 2018 (Oct. 12, 2018), XP055663125, Retrieved from the Internet: URL:https://en.wikipedia.org/w/index.php?title=Patch_verb&oldid=863739273 [retrieved on Jan. 29, 2020] p. 1-p. 6.

* cited by examiner

EFFICIENT HANDLING OF SUBSCRIPTIONS

CROSS-REFERENCE TO RELATED APPLICATIONS

This application is a continuation of U.S. application Ser. No. 17/293,876, now U.S. U.S. Pat. No. 12,028,799, having a filing date of May 13, 2021, which is a 35 U.S.C. § 371 National Stage of International Patent Application No. PCT/IB2019/058840, filed on Oct. 17, 2019, which claims priority to International Patent Application No. PCT/CN2018/115834, filed on Nov. 16, 2018. The above-identified applications are incorporated by reference.

TECHNICAL FIELD

Disclosed are embodiments related to subscription handling and notifications, for instance, with respect to Network Function (NF) management services.

BACKGROUND

3GPP is currently standardizing the 5G Core Network as part of the overall 5G System architecture. The 5G Core Network is standardized in 3GPP TS 23.501 and 23.502, and is composed of a set of certain functional entities, called Network Functions (NFs).

3GPP TS 23.501 describes a 5G System Architecture as a Service Based Architecture (SBA) for the control plane, a system architecture in which the system functionality is achieved by a set of NFs providing services to other authorized NFs to access their services. Control Plane (CP) Network Functions in the 5G System architecture are based on SBA. An NF service is one type of capability exposed by an NF (NF Service Producer) to other authorized NF (NF Service Consumer) through a service-based interface (SBI). An NF service may support one or more NF service operation(s). A service-based interface represents how the set of services is provided or exposed by a given NF. This is the interface where the NF service operations are typically invoked, and it is based on the HTTP/2 protocol.

As provided in 3GPP TS 29.510 V15.1.0, NFStatusSubscribe/NFstatusNotify/NFStatusUnsubscribe operations can be invoked by an NF Service Consumer (or "source NF") requesting to be notified about events (registration, deregistration, profile change) related to an NF instance (or "target NF") located in the same PLMN, or in a different PLMN.

Passages from 3GPP TS 23.502 V15.3.0, section 5.2.7, which describe aspects of NRF service operation, are provided below:

Nnrf NFManagement NFRegister Service Operation (5.2.7.2.2)
  Service Operation name: Nnrf_NFManagement_NFRegister.
  Description: Registers the consumer NF in the NRF by providing the NF profile of the consumer NF to NRF, and NRF marks the consumer NF available.
  Inputs, Required: NF profile of the NF consumer (NF type, NF instance ID, Names of supported NF services).
    NOTE 1: for the UPF, the addressing information within the NF profile corresponds to the N4 interface.
  Inputs, Optional:
    If the consumer NF stores Data Set(s) (e.g. UDR): Range(s) of SUPIs, range(s) of GPSIs, range(s) of external group identifiers, Data Set Identifier(s). If the consumer is BSF: Range(s) of (UE) IPv4 addresses or Range(s) of (UE) IPv6 prefixes.
      NOTE 2: Range of SUPI(s) is limited in this release to a SUPI type of IMSI as defined in TS 23.003 [33].
    If the consumer is UDM, UDR or AUSF, they can include UDM Group ID, UDR Group ID, AUSF Group ID.
    For UDM and AUSF, Routing ID.
    If the consumer is AME, it includes list of GUAMI(s). In addition, AMF may include list of GUAMI(s) for which it can serve as backup for failure/maintenance.
    For the "UPF_Management" service: UPF Provisioning Information as defined in clause 4.17.6.
    S-NSSAI(s) and the associated NSI ID(s) (if available).
    Information about the location of the NF consumer (operator specific information, e.g. geographical location, data center).
    TAI(s).
  Outputs, Required: Result indication.
  Outputs, Optional: None.
  See clause 5.21.2.1 in TS 23.501 [2], the AMF registers itself to NRF.

Nnrf NFManagement NFUpdate Service Operation (5.2.7.2.3)
  Service Operation name: Nnrf_NFManagement_NFUpdate.
  Description: Provides the updated NF profile of NF consumer to NRF.
  Inputs, Required: NF profile of the NF consumer.
  Inputs, Optional: Same as Nnrf_NFManagement_NFRegister service operation.
  Outputs, Required: Result indication.
  Outputs, Optional: None.
  See clause 5.21.2.1 in TS 23.501 [2], the AMF adds or updates the associated GUAMI(s).

Nnrf NFManagement NFDeregister Service Operation (5.2.7.2.4)
  Service Operation name: Nnrf_NFManagement_NFDeregister
  Description: Inform the unavailability of NF consumer to NRF.
  Inputs, Required: NF Instance ID, Reason indication.
  Inputs, Optional: None.
  Outputs, Required: Result indication.
  Outputs, Optional: None.
  See clause 5.21.2.2 in TS 23.501 [2], the AMF deregister itself from NRF.

In particular, sections 5.2.7.2.5 to 5.2.7.2.7 relate to certain subscription and notification operations provided through the NRF:

Nnrf NFManagement NFStatusSubscribe Service Operation (5.2.7.2.5)
  Service Operation name: Nnrf_NFManagement_NFStatusSubscribe.
  Description: Consumer can subscribe to be notified of the following:
    Newly registered NF along with its NF services.
    Updated NF profile.
    Deregistered NF.
  Inputs, Required: NF type (if NF status of a specific NF type is to be monitored), NF instance ID (if NF status of a specific NF instance is to be monitored), NF service (if NF status for NF which exposes a given NF service is to be monitored).

Inputs, Optional:
  For the "UPF_Management" service defined in clause 4.17.6: UPF Provisioning Information as defined in that clause.
  For AMF, Consumer may include list of GUAMI(s). S-NSSAI(s) and the associated NSI ID(s) (if available).
Outputs, Required: When the subscription is accepted: Subscription Correlation ID (required for management of this subscription).
Outputs, Optional: None.
  NOTE: Alternatively, other means such as OA&M can also be used to subscribe for NF status.

Nnrf NFManagement NFStatusNotify Service Operation (5.2.7.2.6)
  Service Operation name: Nnrf_NFManagement_NFStatusNotify.
  Description: NRF notifies subscribed consumers of the following:
    Newly registered NF along with its NF services.
    Updated NF profile.
    Deregistered NF.
  Inputs, Required: NF instance ID, NF Status, NF services (if the notification is for newly registered NE), new NF profile (if the notification is for updated NF profile).
  Inputs, Optional:
    If the NF stores Data Set(s) (e.g. UDR): Range(s) of SUPIs, range(s) of GPSIs, range(s) of external group identifiers, Data Set Identifier(s). For BSF: Range(s) of (UE) IPv4 addresses or Range(s) of (UE) IPv6 prefixes.
    NOTE: Range of SUPI(s) is limited in this release to a SUPI type of IMSI as defined in TS 23.003 [33].
    If the NF is UDM, UDR or AUSF, they can include UDM Group ID, UDR Group ID, AUSF Group ID.
    For UDM and AUSF, Routing ID.
    For the "UPF_Management" service defined in clause 4.17.6: UPF Provisioning Information as defined in that clause.
    For AMF, list of GUAMI(s) may be included. In addition, it may include list of GUAMI(s) for which it can serve as backup for failure/maintenance.
    S-NSSAI(s) and the associated NSI ID(s) (if available).
    Information about the location of the NF (operator specific information, e.g. geographical location, data center).
    TAI(s).
  Outputs, Required: None.
  Outputs, Optional: None.

Nnrf NFManagement NFStatusUnsubscribe Service Operation (5.2.7.2.7)
  Service Operation name: Nnrf_NFManagement_NFStatusUnsubscribe.
  Description: Consumer can unsubscribe from being notified of newly registered NF along with its NF services.
  Inputs, Required: Subscription Correlation ID.
  Inputs, Optional: None.
  Outputs, Required: Operation execution result indication.
  Outputs, Optional: None.
    NOTE: Alternatively, other means such as OA&M can also be used to unsubscribe for NF status.

Additionally, section 5.2.7.3 relates to NF discovery services, passages of which are provided below:
General (5.2.7.3.1)
  Service description: This service enables one NF to discover a set of NF instances with specific NF service or a target NF type. The service also enables one NF service to discover a specific NF service. The service operations defined below allow the NF/NF services to communicate with NRF.

Nnrf NFDiscovery Request Service Operation (5.2.7.3.2)
  Service operation name: Nnrf_NFDiscovery_Request
  Description: provides the IP address or FQDN of the expected NF instance(s) or the Endpoint Address(es) of NF service instance(s) to the NF service consumer.
  Inputs, Required: one or more target NF service Name(s), NF type of the target NF, NF type of the NF service consumer.
  If the NF service consumer intends to discover an NF service producer providing all the standardized services, it provides a wildcard NF service name.
  Inputs, Optional:
    S-NSSAI and the associated NSI ID (if available), DNN, target NF/NF service PLMN ID, NRF to be used to select NFs/services within HPLMN, Serving PLMN ID, the NF service consumer ID, NF location, TAI.
  NOTE 1: For network slicing the NF service consumer ID is a required input.
    FQDN for the S5/S8 interface of the PGW-C+SMF, to discover the N11/N16 interface of the PGW-C+SMF in case of EPS to 5GS mobility.
    If the target NF stores Data Set(s) (e.g., UDR): SUPI, Data Set Identifier(s). (UE) IPv4 address or (UE) IPv6 Prefix.
  NOTE 2: The (UE) IPv4 address or (UE) IPv6 Prefix is provided for BSF discovery: in that case the NRF looks up for a match within one of the Range(s) of (UE) IPv4 addresses or Range(s) of (UE) IPv6 prefixes provided by BSF(s) as part of the invocation of Nnrf_NFManagement_NFRegister operation. The NRF is not meant to store individual (UE) IPv4 addresses or (UE) IPv6 prefixes.
    If the target NF is UDM or AUSF, the request may include Routing ID that was part of SUCI.
    If the target NF is AMF, the request may include AMF region, AMF Set, GUAMI.
    If the target NF is UDR or UDM or AUSF, the request may include UDR Group ID or UDM Group ID or AUSF Group ID respectively.
  NOTE 3: It is assumed that the corresponding NF service consumer is either configured with the corresponding Group ID or it received it via earlier Discovery output.
    For the "UPF_Management" service defined in clause 4.17.6: UPF Provisioning Information as defined in that clause.
  Outputs, Required: FQDN, IP address(es) or Endpoint Addresses for the target Service Name, or all the services supported by the target NF type.
    FQDN, IP address(es) belong to a set of requested target NF instance(s). Endpoint Address(es) belong to a set of requested target, NF service instance(s).
  Outputs, Optional:
    If the target NF stores Data Set(s) (e.g. UDR): Range(s) of SUPIs, range(s) of GPSIs, range(s) of external group identifiers, Data Set Identifier(s). If the target NF is BSF: Range(s) of (UE) IPv4 addresses or Range(s) of (UE) IPv6 prefixes.
  NOTE 4: Range of SUPI(s) is limited in this release to a SUPI type of IMSI as defined in TS 23.003 [33].
    If the target NF is UDM, UDR or AUSF, they can include UDM Group ID, UDR Group ID, AUSF Group ID.
    For UDM and AUSF, Routing ID.

If the target NF is AMF, it includes list of GUAMI(s). In addition, it may include list of GUAMI(s) for which it can serve as backup for failure/maintenance.

For the "UPF_Management" service: UPF Provisioning Information as defined in clause 4.17.6.

S-NSSAI(s) and the associated NSI ID(s) (if available).

Information about the location of the target NF (operator specific information, e.g. geographical location, data center).

TAI(s).

See clause 4.17.4/4.17.5 for details on the usage of this service operation.

A summary Table 5.2.7.1-1 illustrates NF services currently provided by the NRF:

| Service Name | Service Operations | Operation Semantics | Example Consumer(s) |
| --- | --- | --- | --- |
| Nnrf_NFManagement | NFRegister | Request/Response | AMF, SMF, UDM, AUSF, NEF, PCF, SMSF, NSSF, UPF, BSF, CHF |
| | NFUpdate | Request/Response | AMF, SMF, UDM, AUSF, NEF, PCF, SMSF, NSSF, UPF, BSF, CHF |
| | NFDeregister | Request/Response | AMF, SMF, UDM, AUSF, NEF, PCF, SMSF, NSSF, UPF, BSF, CHF |
| | NFStatusSubscribe | Subscribe/Notify | AMF, SMF, PCF, NEF, NSSF, SMSF, AUSF, CHF |
| | NFStatusNotify | | AMF, SMF, PCF, NEF, NSSF, SMSF, AUSF, CHF |
| | NFStatusUnSubscribe | | AMF, SMF, PCF, NEF, NSSF, SMSF, AUSF, CHF |
| Nnrf_NFDiscovery | Request | Request/Response | AMF, SMF, PCF, NEF, NSSF, SMSF, AUSF, CHF |
| Nnrf_AccessToken | Get | Request/Response | AMF, SMF, PCF, NEF, NSSF, SMSF, AUSF, UDM |

SUMMARY

According to embodiments, an update procedure for subscriptions is provided using an HTTP PATCH request to the resource that identifies the subscription. In certain aspects, by invoking this procedure, it is not necessary for the subscribing Network Function (NF) to wait until an existing subscription is terminated (by expiration of its validity time), and it is not necessary for the Network Repository Function (NRF) to create a brand new subscription, which can be computationally intensive depending on the particular subscription request.

According to embodiments, an NF Service Producer registers its profile in an NRF. A given NF Service Consumer, interested in invoking the services offered by such an NF Service Producer, creates a subscription in the NRF, and asks to be notified whenever the profile of that NF Service Producer is updated. As part of the subscription result reporting from the NRF, the NF Service Consumer receives an initial subscription validity time, after which the subscription can be considered as terminated at the NRF side. Based on this information, the NF Service Consumer, prior to the expiration of such initial subscription validity time, sends a PATCH request to the resource URI identifying the individual subscription resource. The payload body of the PATCH request can contain a "replace" operation on the "validityTime" attribute of the SubscriptionData structure. According to embodiments, the NRF, if it accepts the extension of the subscription validity time of the subscription, may answer with HTTP 204 No Content with an empty response body (e.g., if it accepts the proposed subscription validity time sent by the NF Service Consumer), or it may answer with HTTP 200 OK (if it does not accept the proposed subscription validity time, and requires a different subscription validity time; in this case, the new value is sent by the NRF to the NF Service Consumer as part of the HTTP response body, as part of the overall resource representation of the "subscription" resource).

According to embodiments, a method in a second node is provided. The method comprises: receiving, from a first node, a first message, wherein the first message is a request for a subscription; sending, to the first node, a second message, wherein the second message comprises a subscription ID for the subscription; and receiving, from the first node, a third message, wherein the third message comprises a request to extend a validity time for the subscription. In some embodiments, the second message comprises an initial subscription validity time, and the method further comprises sending a fourth message in response to the third message, wherein the fourth message indicates an updated subscription validity time for the subscription. The updated subscription validity time for the subscription may be different than the subscription validity time period indicated by the validity time extension request. In some embodiments, the fourth message is one or more of an HTTP 204 No Content message, and an HTTP 200 message comprising subscription data. The subscription data may comprise, for example, one or more of the updated subscription validity time, the subscription ID, and a subscription type. Additionally, the method can include receiving, from a third node, a fifth message, wherein the fifth message is a registration message; and sending, to the third node, a sixth message, wherein the sixth message indicates a registration status. According to embodiments, the first message comprises input criteria, wherein the input criteria comprise one or more of an event type, an instance identifier corresponding to the second node, and a set of conditions identifying one or more network functions for the subscription. The first message may be, for example, an HTTP POST message and the input criteria may be in the form of a JSON document contained in the body the HTTP POST message. In certain aspects, the event type comprises one or more of register, de-register, and profile change and the set of conditions comprises one or more of network functions of a given type, all NFs supporting a given service, and all NFs belonging to a common set or group ID. According to embodiments, the first node is an NF Service Consumer, the second node is a Network Repository Function (NRF), and the third node is an NF Service Producer. The method may also comprise generating the subscription ID and determining the initial subscription validity time. Additionally, in some embodiments, the second message is an HTTP 201 message indicating that the first node has been successfully subscribed in accordance with the request for subscription, and the third message is an HTTP PATCH message. The method may also comprise sending a fourth message in response to the third message, wherein the fourth message is an HTTP 400/500 message indicating one or more problems with the time extension request. According to embodiments, the subscription is to receive notifications regarding updates to one or more services.

According to embodiments, a method in a first node is provided. The method comprises: sending, to a second node, a first message, wherein the first message is a request for a subscription; receiving, from the second node, a second message, wherein the second message comprises a subscription ID for the subscription; and sending, to the second node, a third message, wherein the third message comprises a validity time extension request for the subscription. In some embodiments, the second message comprises an initial subscription validity time. The method may also further comprise receiving a fourth message, wherein the fourth message indicates an updated subscription validity time for the subscription. The updated subscription validity time for the subscription can be different than the validity time indicated by the validity time extension request. According to embodiments, the fourth message is one or more of an HTTP 204 No Content message and an HTTP 200 message comprising subscription data, and the subscription data can comprise one or more of the updated time period, the subscription ID, and a subscription type. Also, the first message may comprise input criteria, wherein the input criteria comprise one or more of an event type, an instance identifier corresponding to the second node, and a set of conditions identifying one or more network functions for the subscription. In some embodiments, the first message is an HTTP POST message and the input criteria are in the form of a JSON document contained in the body the HTTP POST message. In some embodiments, the event type comprises one or more of register, de-register, and profile change, and the set of conditions comprises one or more of network functions of a given type, all NFs supporting a given service, and all NFs belonging to a common set or group ID. According to embodiments, the first node is an NF Service Consumer, and the second node is a Network Repository Function (NRF), and the subscription relates to services provided by an NF Service Producer. The method may also include determining the validity time extension request. In some embodiments, the second message is an HTTP 201 message indicating successful subscription in accordance with the request for subscription, and the third message is an HTTP PATCH message. According to some embodiments, the method may also comprise receiving a fourth message, wherein the fourth message is an HTTP 400/500 message indicating one or more problems with the time extension request. In some instance, the subscription is to receive notifications regarding updates to one or more services.

According to embodiments, a node, such as an NRF or NF Service Consumer, is adapted to perform one or more the foregoing methods.

According to embodiments, a computer program is provided, comprising instructions which, when executed on at least one processor, cause the at least one processor to carry out the method according to any of the foregoing methods. According to embodiments, a carrier containing the computer program is provided, wherein the carrier is one of an electronic signal, optical signal, radio signal, or computer readable storage medium.

According to embodiments, a node for handling of subscriptions comprising a processor and a memory is provided, the memory containing instructions executable by the processor whereby the node is operative to perform any of the foregoing methods.

According to embodiments, a computer program comprising computer program code stored on a non-transitory computer readable medium is provided, which, when run on a node causes the node to perform one or more of the foregoing methods.

These and other features of the present disclosure will become apparent to those skilled in the art from the following detailed description of the disclosure, taken together with the accompanying drawings.

BRIEF DESCRIPTION OF THE DRAWINGS

The accompanying drawings, which are incorporated herein and form part of the specification, illustrate various embodiments.

DETAILED DESCRIPTION

Figure 1:
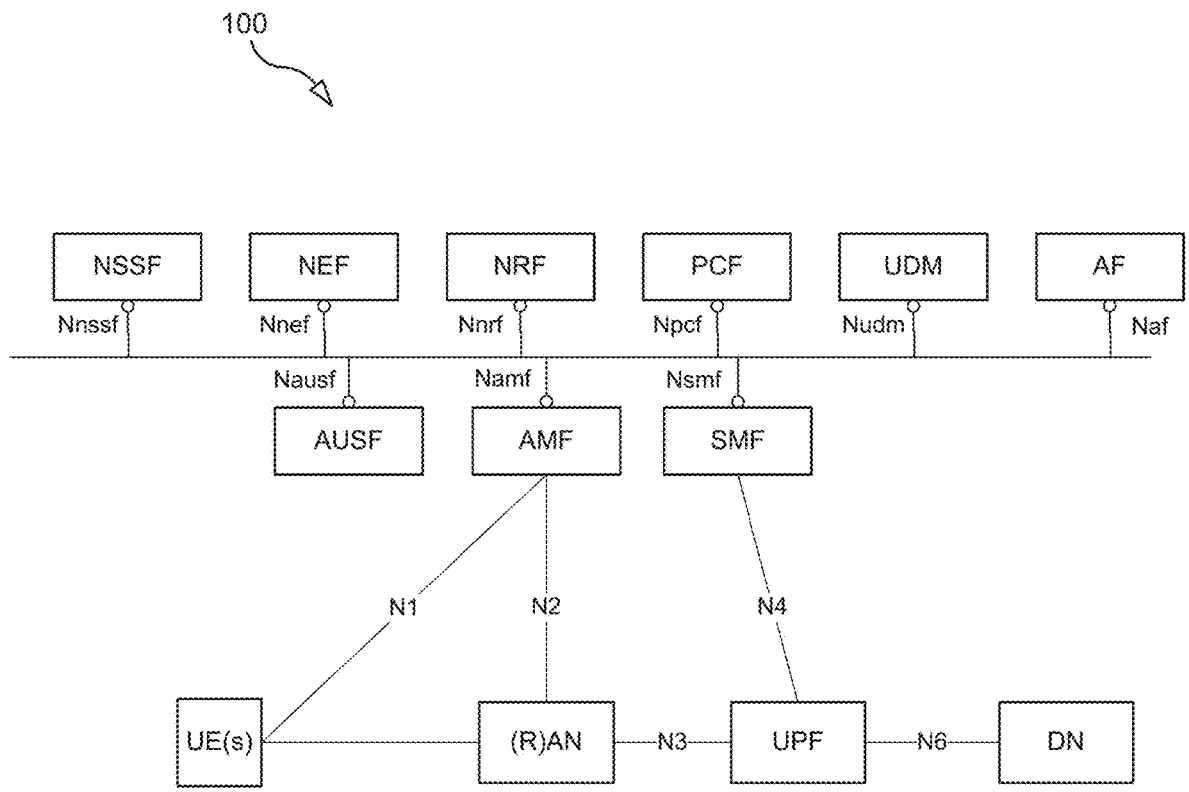
FIG. 1 illustrates a system according to some embodiments.

A 5G System reference architecture 100, for instance as defined in 3GPP TS 23.501, showing service-based interfaces used within the Control Plane, is depicted in FIG. 1. In this example, not all NFs are necessarily depicted.

The Network Repository Function (NRF) is a key NF within the 5GC SBA Framework that provides support to service providers to register their services so that service consumers can dynamically discover them. The data that an NF provides to the NRF as part of its registration is called an "NF Profile," and comprises generic data associated to the specific NF instance, and also to the different NF service instances (HTTP services) that can be invoked.

The service discovery function enabled by an NRF provides the address of the NF instances that exist in a network for providing a service and all necessary information to issue and route requests towards the selected target NF producer (e.g., protocol, port, FQDN and/or IP address of target NF instance amongst other parameters required to create a URI used in the HTTP request).

The NFs interact with the NRF via two main services:

NF Management: for registration to NRF of the profile of a given NF, deregistration from NRF, and subscription to notifications when other NFs register, deregister, or update their profile.

NF Discovery: to discover which NFs, satisfying certain filter criteria, are available for service invocation.

Referring now to FIG. 1, FIG. 1 illustrates a 5G network architecture 100 using service-based interfaces between the NFs in the control plane, according to some embodiments. In this example, the service(s) that a NF provides to other authorized NFs can be exposed to the authorized NFs through the service-based interface. In FIG. 1, the service-based interfaces are indicated by the letter "N" followed by the name of the NF, e.g. Namf for the service-based interface of the AMF and Nsmf for the service-based interface of the SMF, etc. FIG. 1 includes the Network Exposure Function (NEF) and the Network Repository Function (NRF).

As seen from the access side, the 5G network architecture shown in FIG. 1 comprises a plurality of User Equipment (UEs) connected to either a Radio Access Network (RAN) or an Access Network (AN) as well as an Access and Mobility Management Function (AMF).

Typically, the R (AN) comprises base stations, e.g. such as evolved Node Bs (eNBs) or 5G base stations (gNBs) or similar. Seen from the core network side, the 5G core NFs shown in FIG. 1 include a Network Slice Selection Function (NSSF), an Authentication Server Function (AUSF), a Unified Data Management (UDM), an Access and Mobility Management Function (AMF), a Session Management Function (SMF), a Policy Control Function (PCF), an Application Function (AF).

Reference point representations of the 5G network architecture are used to develop detailed call flows in the normative standardization. The N1 reference point is defined to carry signaling between UE and AMF. The reference points for connecting between AN and AMF and between AN and UPF are defined as N2 and N3, respectively. N4 is used by SMF and UPF so that the UPF can be set using the control signal generated by the SMF, and the UPF can report its state to the SMF. N9 is the reference point for the connection between different UPFs.

In many respects, the 5G core network aims at separating user plane and control plane. The user plane typically carries user traffic while the control plane carries signaling in the network. In FIG. 1, the UPF is in the user plane and all other NFs shown, i.e., AMF, SMF, PCF, AF, AUSF, and UDM, are in the control plane. Separating the user and control planes helps each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The 5G core network architecture is composed of modularized functions. For example, the AMF and SMF are independent functions in the control plane. Separated AMF and SMF allow independent evolution and scaling. Other control plane functions like PCF and AUSF can be separated as shown in FIG. 1. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Some properties of the NFs shown in FIG. 1 may be described in the following manner. The AMF provides UE-based authentication, authorization, mobility management, etc. A UE even using multiple access technologies is basically connected to a single AMF because the AMF is independent of the access technologies. The SMF is responsible for session management and allocates IP addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make AMF and SMF operate properly. The AUSF supports authentication function for UEs or similar and thus stores data for authentication of UEs or similar while UDM stores subscription data of UE. The Data Network (DN), not part of the 5G core network, provides Internet access or operator services and similar.

According to embodiments, an NF may be implemented either as a network element on dedicated hardware, as a software instance running on a dedicated hardware, or as a virtualized function instantiated on an appropriate platform, e.g., a cloud infrastructure.

According to embodiments, an NF (e.g., a "subscribing NF") creates a subscription in the NRF by providing a number of input criteria. Such input criteria may comprise:

Type of event that occurs in the subscribed NF (register, de-register, profile change)

The "Instance ID" of the subscribed NF

Conditions to identify a set of subscribed NFs (e.g., all NFs of a given type, all NFs supporting a given service, all NFs belonging to a common set or group ID, etc.)

This information can be sent by the subscribing NF by means of an HTTP POST request to the NRF. For example, all input data can be sent in the HTTP request body, in the form of a JSON document.

Once the subscription is created, the NRF determines for how long the subscription is valid. After that time elapses, the subscription may be terminated.

In current systems, after a subscription has been created in the NRF, it is not possible to extend the subscription validity time, and the only way to keep the NF Service Consumer receiving the notifications is to create a new subscription when the former one has expired. This behavior is not optimal, and aspects of this disclosure provide systems and methods by which it is possible to extend an existing subscription for an additional time period.

Figure 2:
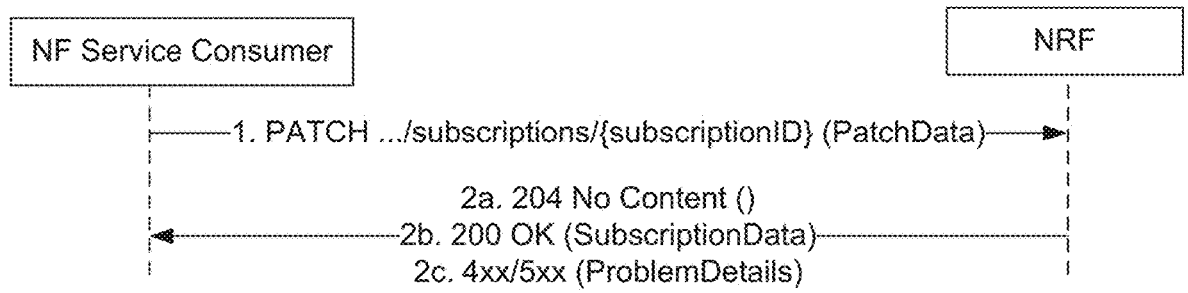
FIG. 2 illustrates a flow diagram according to some embodiments.

Referring now to FIG. 2, a messaging flow diagram according to embodiments is provided. FIG. 2 illustrates, for instance, how an HTTP PATCH message can be used to update an existing subscription in NRF.

According to embodiments, an extension request message may be sent from a first node (e.g., an NF Service Consumer) to a second node (e.g., an NRF) to extend the validity time of a subscription. The message may be, according to embodiments, an HTTP PATCH message that includes subscription information, such as subscription ID. The data may further include a requested extension of time, for instance, a new validity time corresponding to the subscription. According to embodiments, an NF Service Consumer sends an HTTP PATCH request to the resource URI identifying the individual subscription resource. The payload body of the PATCH request contains a "replace" operation on the "validityTime" attribute of the SubscriptionData structure and contains a new suggested value for it; no other attribute of the resource is updated as part of this operation, according to embodiments.

According to embodiments, the second node (e.g., the NRF) can respond in at least three ways, including:
(1) a null response, such as a 204 No Content message, which can indicate that the requested extension has been accepted;
(2) a fuller response, such as a 200 OK message, which can indicate one or more of an acceptance of the requested extension or provide a new/different validity time; and
(3) a negative response, such as a 4xx/5xx response indicating one or more problems with the request, which can further indicate the specific problems with said request.

For instance, if the creation of the subscription fails at the NRF due to errors in the request body, the NRF could return "400 Bad Request" status code with the details of the error. If the creation of the subscription fails at the NRF due to NRF internal errors, the NRF could return "500 Internal Server Error" status code with the details of the error. According to embodiments, a full response, such as a 200 OK message may comprise additional data, including subscription ID and event type.

In one embodiment, responses 2a, 2b, and 2c of FIG. 2 may be defined as follows:
2a. On success, if the NRF accepts the extension of the validity time of the subscription, and it accepts the requested value for the "validityTime" attribute, a response with status code "204 No Content" may be returned.
2b. On success, if the NRF accepts the extension of the validity time of the subscription, but it assigns a different validity time than the validity time suggested by the NF Service Consumer, a response with the "200 OK" status code may be returned. The response may contain the new resource representation of the "subscription" resource, which includes the new validity time, as determined by the NRF, after which the subscription becomes invalid.
2c. If the update of the subscription fails at the NRF due to errors in the JSON Patch object in the request body, the NRF may return a response with a "400 Bad Request" status code with the ProblemDetails Information Element (IE) providing details of the error. If the update of the subscription fails at the NRF due to NRF internal errors, the NRF may return a response with a "500 Internal Server Error" status code with the ProblemDetails IE providing details of the error.

Different specific messaging/content may be provided in other embodiments.

In certain aspects, the interaction between the subscribing NF and the NRF is more efficient, since the creation of a subscription may be a computationally intensive process (depending on the conditions for subscribing to sets/groups of NFs), and it can be more efficient to extend the lifetime of a subscription by updating the subscription validity time rather than having to re-create a new subscription.

Although FIG. 2 uses an NF Service Consumer and an NRF for the example, the messaging may be applied between different nodes and/or functions having a subscribe/notify pattern, including, for instance: any NF (e.g., AMF and SMF) that subscribes to UDM for the Subscribe Data Management service; any NF (e.g., NEF) that subscribes to UDM for the Event Exposure service; any NF (e.g., AMF) that subscribes to PCF for the AM Policy Control service; any NF (e.g., AF and NEF) that subscribes to PCF for the Policy Authorization service; any NF (e.g., SFM) that subscribes to NEF for the PFD Management service; any NF (e.g., AMF or SMF) that subscribes to SMF for the PDU Session service.

Figure 3:
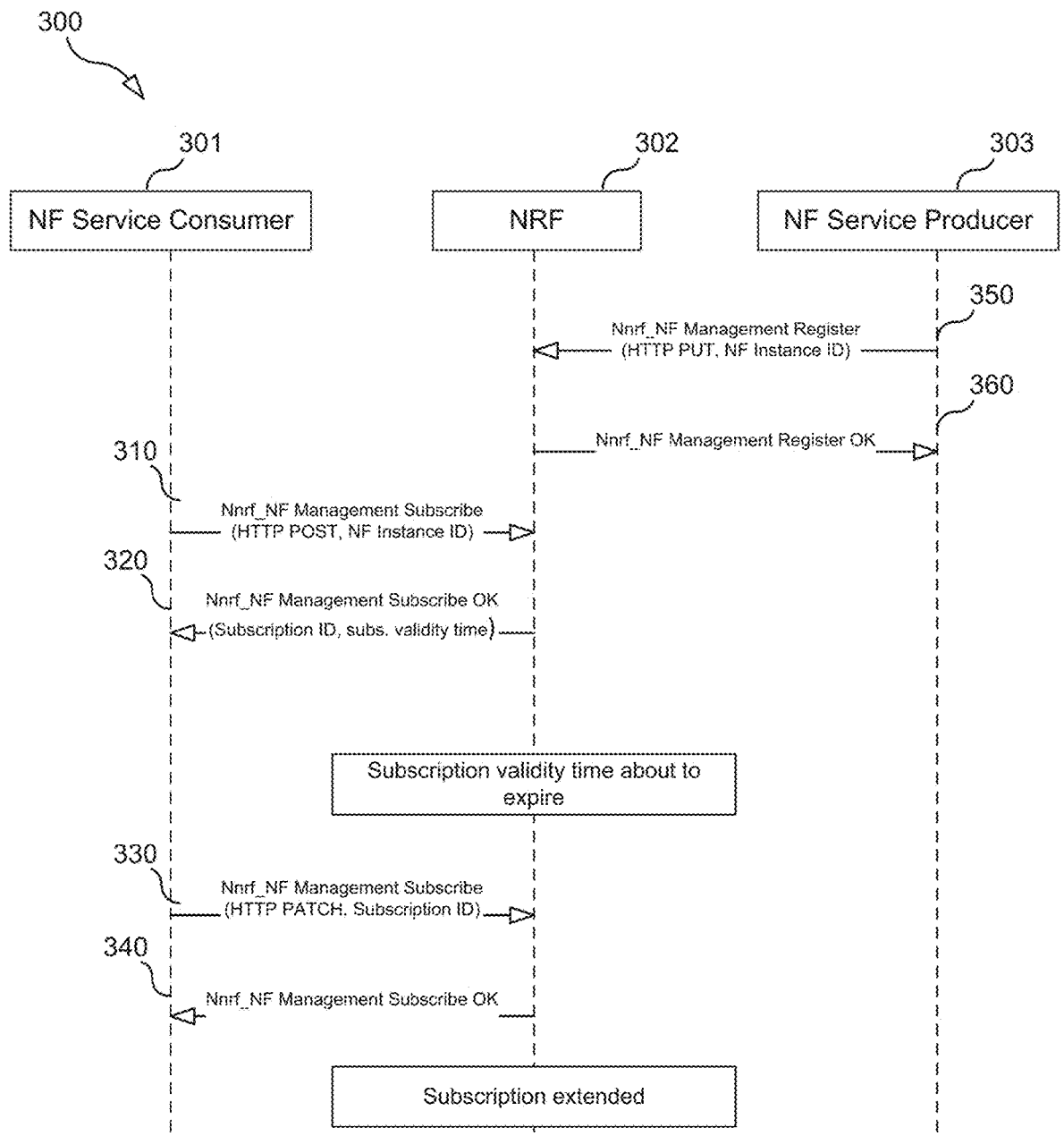
FIG. 3 illustrates a flow diagram according to some embodiments.

Similarly, FIG. 3 may be implemented with respect to such additional network functions and relationships. Additional examples are provided in 3GPP TS 23.502 V15.3.0, for instance in the service descriptions (e.g., 5.2.3-1, Table 5.2.5.1-1, and Table 5.2.6.1-1). Aspects of the disclosure may be applied with respect to services listed by 3GPP TS 23.502 V15.3.0 in Table 5.2.7.1-1 (Services of the NRF).

Referring now to FIG. 3, a messaging flow diagram according to embodiments is provided. Such messaging 300 may be implemented, for instance, by one or more nodes 301, 302, and 303 as described with respect to FIGS. 6 and 7.

In certain aspects, subscription to notifications on NF Instances can be updated. Such updates can include an update to refresh the validity time when the time is about to expire. For example, an NF Service Consumer 301 may request a new validity time to the NRF 302, and the NRF 302 may answer with the new assigned validity time, if the operation is successful. In some embodiments, this operation is executed by updating the resource identified by "subscriptionID," and is invoked by issuing an HTTP PATCH request on the URI representing the individual resource. The messaging illustrated with respect to FIG. 3 can provide for management of notifications for a first node 301. For instance, second node 302 (e.g., an NRF) may handle subscription information and updates for one or more subscribing nodes 301 (e.g., an NF Service Consumer) that subscribe to notifications, including updates relating to a set of services or functions, which may correspond to a third node 303 (e.g., NF Service Producer).

According to some embodiments, the process may begin with a first node 301, such as an NF Service Consumer, sending a message 310. This message can be a subscription message, for example, to register and obtain updates to services. Such services could include those provided by node 303, such as an NF Service Producer. In certain aspects, the message 310 is an HTTP POST message, which can include an Instance ID for the network function. With message 320, the second node 302, such as an NRF, can respond. Such a response can indicate a successful subscription. This can be a 201 Created response, in some instances, and may include one or more of a subscription ID and subscription validity time. As part of this process, the node 302 may determine an appropriate set of functions, such as from NF Service Producers, that meet the subscription request indicated by message 310. Node 302 may also generate a token for the subscription, which may be the Subscription ID.

Subsequently, for instance when the subscription validity time is about to expire, node 301 may send another message 330 to update the subscription. According to embodiments, the message 330 is an HTTP PATCH. This message can include, for example, both the Subscription ID and a requested extension to the corresponding subscription validity time. The second node 302 (e.g., the NRF) can respond with message 340. According to embodiments, the message 340 indicates a status of the request provided in message 330. The message may comprise:

(1) a null response, such as a 204 No Content message, which can indicate that the requested extension has been accepted;

(2) a response, such as a 200 OK message, which can indicate one or more of an acceptance of the requested extension or provide a new/different validity time; and (3) a negative response, such as a 4xx/5xx response indicating one or more problems with the request, which can further indicate the specific problems with said request.

An example of messages 330 and 340 is provided below:

```
Request
PATCH .../subscriptions/2a58bf47
Content-Type: application/json-patch+json
[
  { "op": "REPLACE", "path": "/validityTime", "value": "2018-12-30T23:20:50Z" },
]
Response
HTTP/2 200 OK
Content-Location: .../subscriptions/2a58bf47
```

Although illustrated as an HTTP 200 message in this example, according to embodiments, the message 340 can be an HTTP 204 message:

Response

HTTP/2 204 No Content

According to some embodiments, node 302 responds in message 340 with a different validity time than requested by node 301.

The node 302 may also perform one or more determinations to evaluate the validity of the requested extension, including determining availability of one or more resources or any applicable restrictions/authorization requirements. The message 340 may be based on such a determination.

The messaging 300 may conclude, according to embodiments, with the expiration of the subscription.

In some embodiments, messaging 300 may also include messages 350 and 360. These messages may come before messages 310-340, and register one or more services with the node 302. Message 350 may be, for instance an HTTP PUT, and message 360 may indicate a successful registration with respect to such services.

Figure 4:
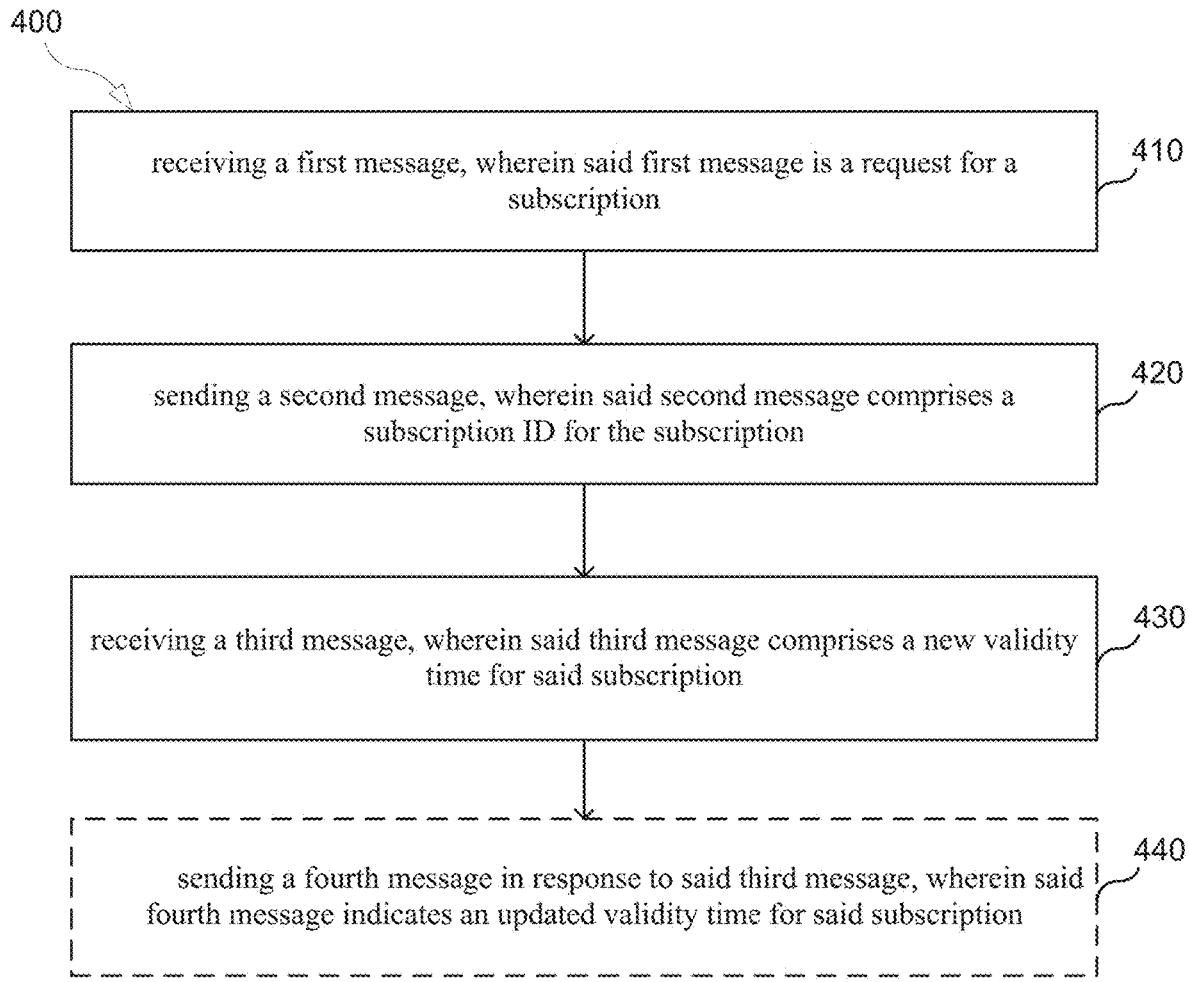
FIG. 4 illustrates a flow diagram according to some embodiments.

Referring now to FIG. 4, a process 400 is provided according to embodiments. Process 400 may be implemented, for instance, by one or more nodes 301, 302, and 303 as described with respect to FIGS. 6 and 7. For example, process 400 may be performed by an NRF.

Process 400 may begin, for example, at step 410 in which a first message is received. The message may be a request for a subscription, and may be an HTTP POST message such as message 310 described with respect to FIG. 3. In step 420, a second message is sent. This message may comprise a subscription ID for the subscription, and may correspond to message 320 described with respect to FIG. 3. In step 430, a third message is received, which comprises a time extension request (i.e., a request to extend the subscription validity time) corresponding to the subscription. This message may correspond to message 330 described with respect to FIG. 3. According to some embodiments, the process 400 may optionally include step 440, in which a fourth message is sent that indicates an updated validity time for the subscription, such as message 340 of FIG. 3. In some instances, a fourth message may be sent that indicates a problem with the request.

Figure 5:
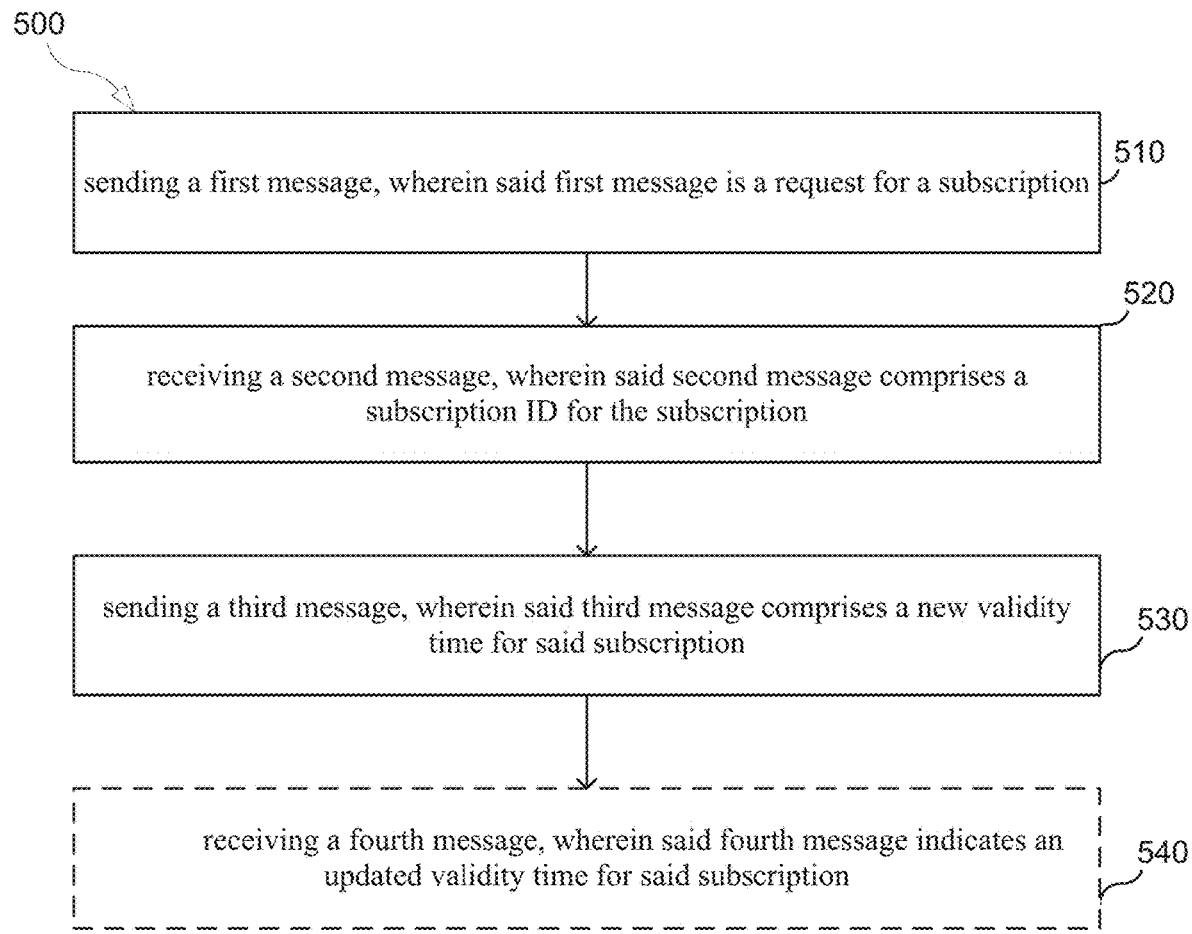
FIG. 5 illustrates a flow diagram according to some embodiments.

Referring now to FIG. 5, a process 500 is provided according to embodiments. Process 500 may be implemented, for instance, by one or more nodes 301, 302, and 303 as described with respect to FIGS. 6 and 7. For example, process 500 may be performed by an NF Service Consumer.

Process 500 may begin, for example, at step 510 in which a first message is sent. The message may be a request for a subscription, and may be an HTTP POST message such as message 310 described with respect to FIG. 3. In step 520, a second message is received. This message may comprise a subscription ID for the requested subscription, and may correspond to message 320 described with respect to FIG. 3. In step 530, a third message is sent, which comprises a time extension request (i.e., a request to extend the subscription validity time) corresponding to the subscription. This message may correspond to message 330 described with respect to FIG. 3. According to some embodiments, the process 500 may optionally include step 540, in which a fourth message is received that indicates an updated validity time for the subscription, such as message 340 of FIG. 3. In some instances, a fourth message may be received that indicates a problem with the request.

Figure 6A:
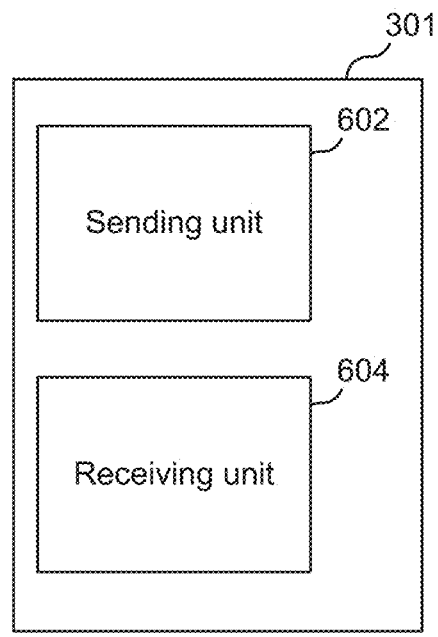
FIGS. 6A and 6B are diagrams showing functional modules of nodes according to some embodiments.

FIG. 6A is a diagram showing functional modules of a first node, such as node 301 (e.g., an NF Service Consumer), according to some embodiments. As shown in FIG. 6A, the first node comprises one or more of a sending unit 602 and a receiving unit 604. According to embodiments, sending unit 602 is arranged to send messages, such as messages 310 and 330 and as described with respect to steps 510 and 530 of FIG. 5. According to embodiments, receiving unit 604 is arranged to received messages, such as messages 320 and 340 and as described with respect to step 520, and in some cases, step 540. Similarly, the first node may be adapted to send and/or receive the messages set forth in FIG. 2.

Figure 6B:
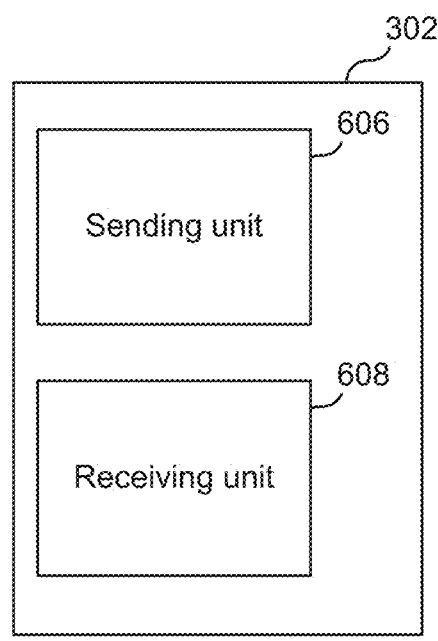

FIG. 6B is a diagram showing functional modules of a second node, such as node 302 (e.g., an NRF), according to some embodiments. As shown in FIG. 6B, the second node comprises one or more of a sending unit 606 and a receiving unit 608. According to embodiments, sending unit 606 is arranged to send messages, such as messages 320 and 340 and as described with respect to steps 420 and optionally 440 of FIG. 4. According to embodiments, receiving unit 608 is arranged to receive messages, such as messages 310 and 330 and as described with respect to steps 410 and 430. Similarly, the second node may be adapted to send and/or receive the messages set forth in FIG. 2.

Figure 7:
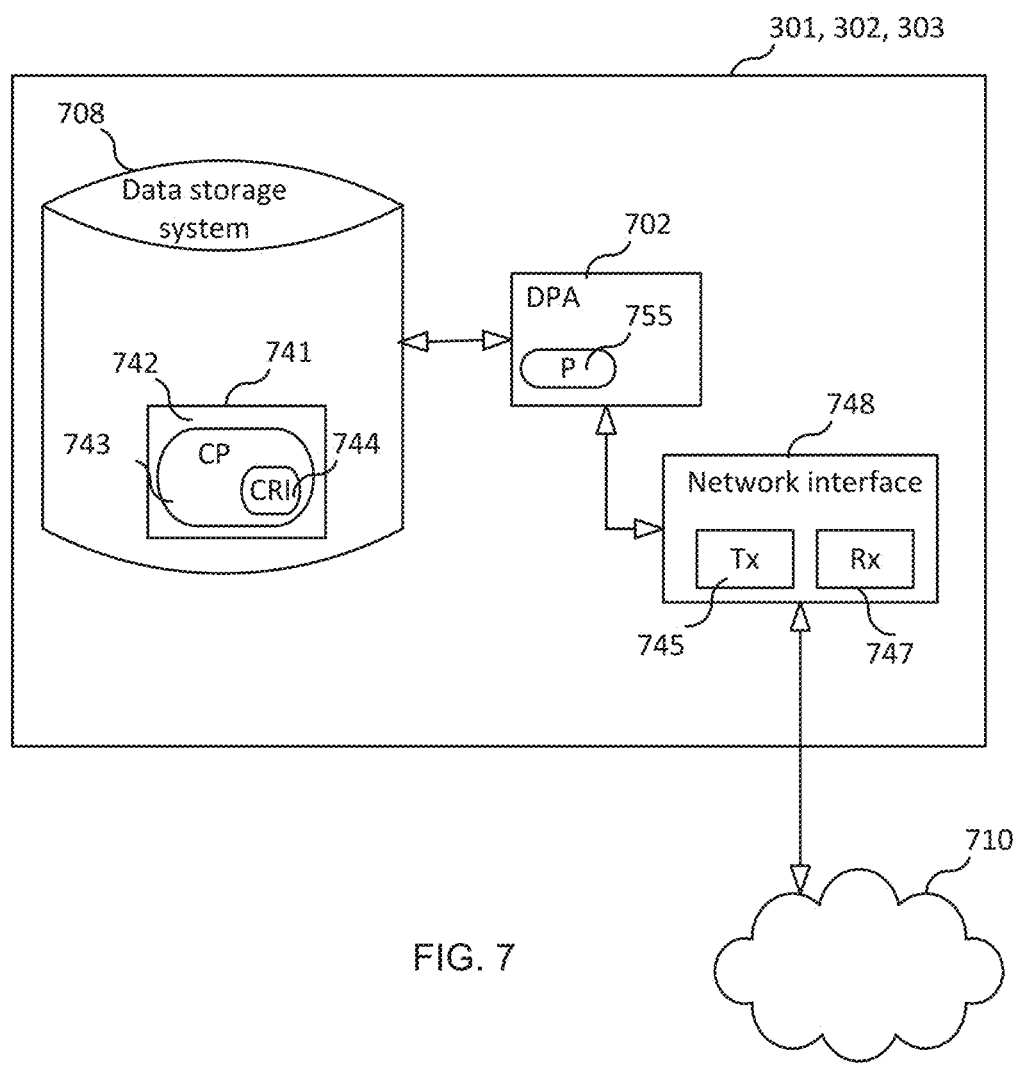
FIG. 7 is a block diagram of a node according to some embodiments.

FIG. 7 is a block diagram of a node, such as the first node 301 (e.g. NF Service Consumer), second node 302 (e.g. NRF), or third node 303 (NF Service Producer) according to some embodiments. As shown in FIG. 7, the node may comprise: a data processing apparatus (DPA) 702, which may include one or more processors (P) 755 (e.g., a general purpose microprocessor and/or one or more other processors, such as an application specific integrated circuit (ASIC), field-programmable gate arrays (FPGAs), and the like); a transmitter 705 and a receiver 704 coupled to an antenna 722 for enabling the node to transmit data to and receive data from an AN node (e.g., base station); and local storage unit (a.k.a., "data storage system") 708, which may include one or more non-volatile storage devices and/or one or more volatile storage devices (e.g., random access memory (RAM)). In embodiments where the node includes a general purpose microprocessor, a computer program product (CPP) 741 may be provided. CPP 741 includes a computer readable medium (CRM) 742 storing a computer program (CP) 743 comprising computer readable instructions (CRI) 744. CRM 742 may be a non-transitory computer readable medium, such as, but not limited, to magnetic media (e.g., a hard disk), optical media, memory devices (e.g., random access memory), and the like. In some embodiments, the CRI 744 of computer program 743 is configured such that when executed by data processing apparatus 702, the CRI causes the node to perform steps described above (e.g., steps described above with reference to the flow charts). In other embodiments, the node may be configured to perform steps described herein without the need for code. That is, for example, data processing apparatus 702 may consist merely of one or more ASICs. Hence, the features of the embodiments described herein may be implemented in hardware and/or software.

According to embodiments, aspects of an API are provided, for instance, with respect to network function management, such as an Nnrf_NFManagement API. An example comprises the following:

```
/subscriptions/{subscriptionID}:
    patch:
        summary: Updates a subscription
        operationid: UpdateSubscription
        tags:
            - Subscription ID (Document)
        parameters:
            - name: subscriptionID
              in: path
              required: true
              description: Unique ID of the subscription to update
              schema:
                  type: string
                  pattern: '^([0-9]{5,6}-)?[^-]+$'
        requestBody:
            content:
                application/json-patch+json:
                    schema:
                        type: array
                        items:
                            $ref:
'TS29571_CommonData.yaml#/components/schemas/PatchItem'
            required: true
        responses:
            '200':
                description: Expected response to a valid request
                content:
                    application/json:
                        schema:
                            $ref: '#/components/schemas/SubscriptionData'
            '400':
                $ref: 'TS29571_CommonData.yaml#/components/responses/400'
            '403':
                $ref: 'TS29571_CommonData.yaml#/components/responses/403'
            '404':
                $ref: 'TS29571_CommonData.yaml#/components/responses/404'
            '411' :
                $ref: 'TS29571_CommonData.yaml#/components/responses/411'
            '413':
                $ref: 'TS29571_CommonData.yaml#/components/responses/413'
            '415':
                $ref: 'TS29571_CommonData.yaml#/components/responses/415'
            '500':
                $ref: 'TS29571_CommonData.yaml#/components/responses/500'
            '501':
                $ref: 'TS29571_CommonData.yaml#/components/responses/501'
            '503':
                $ref: 'TS29571_CommonData.yaml#/components/responses/503'
            default:
                $ref:
'TS29571_CommonData.yaml#/components/responses/default'
    delete:
        summary: Deletes a subscription
        operationId: RemoveSubscription
        tags :
            - Subscription ID (Document)
        parameters:
            - name: subscriptionID
              in: path
              required: true
              description: Unique ID of the subscription to remove
              schema:
                  type: string
                  pattern: '^([0-9]{5,6}-)?[^-]+$'
```

Abbreviations

| Term | Abbreviation |
| --- | --- |
| Network Function | NF |
| Network Repository Function | NRF |
| User Equipment | UE |
| Radio (Access Network) | R(AN) |
| Data Network | DN |
| JavaScript Object Notation | JSON |
| Service Based Architecture | SBA |
| Control Plane | CP |
| Service Based Interface | SBI |
| Public Land Mobil Network | PLMN |
| Access and Mobility Management Function | AMF |
| Session Management Function | SMF |
| Unified Data Management | UDM |
| Authentication Server Function | ASF/AuSF |
| Unified Data Management | UDM |
| Application Function | AF |
| Network Exposure Function | NEF |
| Policy Control Function | PCF |
| Short Message Service Function | SMSF |
| Network Slice Selection Function | NSSF |
| User Plane Function | UPF |
| Bootstrapping Server Function | BSF |
| Charging Function | CHF |

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel. Although the present disclosure and its advantages have been described in detail, it should be understood that various changes, substitutions and alterations can be made herein without departing from the spirit and scope of the disclosure as defined by the appended claims.

The invention claimed is:

1. A method in a second node, comprising:
    receiving, from a first node, a first message, wherein said first message is a request for a subscription;
    sending, to said first node, a second message, wherein said second message comprises a subscription ID for the subscription and an initial subscription validity time;
    receiving, from said first node, a third message, wherein said third message comprises a new subscription validity time for said subscription; and
    accepting an extension of the subscription validity time and sending a fourth message in response to said third message, wherein said fourth message indicates an updated subscription validity time for said subscription that is different than the new subscription validity time.

2. The method of claim 1, wherein said fourth message is an HTTP 200 OK message comprising subscription data.

3. The method of claim 2, wherein said subscription data comprises said updated time period or said subscription ID.

4. The method of claim 1, further comprising:
    receiving, from a third node, a fifth message, wherein said fifth message is a registration message; and
    sending, to said third node, a sixth message, wherein said sixth message indicates a registration status.

5. The method of claim 4, wherein said second node is a Network Repository Function, NRF, said first node is a NF Service Consumer, and said third node is a NF Service Producer.

6. The method of claim 1, wherein said first message comprises input criteria, wherein said input criteria comprise one or more of an event type, an instance identifier corresponding to said second node, or a set of conditions identifying one or more network functions for said subscription.

7. The method of claim 6, wherein said first message is an HTTP POST message and said input criteria are in the form of a JSON document contained in the body of said HTTP POST message.

8. The method of claim 6,
    wherein said event type comprises one or more of register, de-register, or profile change, or
    wherein said set of conditions comprises one or of more network functions, NF, of a given type, all NFs supporting a given service, or all NFs belonging to a common set or group ID.

9. The method of claim 1, further comprising:
    generating said subscription ID; and
    determining said initial subscription validity time.

10. The method of claim 1, wherein said second message is an HTTP 201 message indicating that said first node has been successfully subscribed in accordance with said request for subscription.

11. The method of claim 1, wherein said third message is an HTTP PATCH message.

12. The method of claim 1, wherein said fourth message is an HTTP 204 No Content message.

13. A method in a first node, comprising:
    sending to a second node, a first message, wherein said first message is a request for a subscription;
    receiving, from said second node, a second message, wherein said second message comprises a subscription ID for the subscription and an initial subscription validity time;
    sending, to said second node, a third message, wherein said third message comprises a requested new validity time for said subscription; and
    receiving a fourth message, wherein said fourth message indicates an updated validity time period for said subscription that is different than the requested new validity time for said subscription.

14. The method of claim 13, wherein said fourth message is an HTTP 200 message comprising subscription data, and wherein said subscription data comprises said updated time period or said subscription ID.

15. The method of claim 13, wherein said first message comprises input criteria, wherein said input criteria comprise one or more of an event type, an instance identifier corresponding to said second node, and a set of conditions identifying one or more network functions for said subscription, wherein
    said first message is an HTTP POST message and said input criteria are in the form of a JSON document contained in the body said HTTP POST message, or
    said event type comprises one or more of register, de-register, and profile change, or said set of conditions comprises one or more of network functions, NF, of a given type, all NFs supporting a given service, or all NFs belonging to a common set or group ID.

16. The method of claim 13, wherein said second node is a Network Repository Function, NRF, said first node an NF Service Consumer, and said subscription relates to services provided by an NF Service Producer.

17. The method of claim 13, further comprising: determining the new subscription validity time.

18. The method of claim 13, wherein said second message is an HTTP 201 message indicating successful subscription in accordance with said request for subscription, or said third message is an HTTP PATCH message.

19. The method of claim 13, wherein said fourth message is an HTTP 204 No Content message.

\* \* \* \* \*